Nov. 3, 1964   J. K. MUREK   3,155,009
HIGH ENERGY ACTUATOR APPARATUS
Filed Aug. 3, 1961   2 Sheets-Sheet 1

INVENTOR.
JOSEF K. MUREK
BY [signature]
ATTORNEY
[signature]
AGENT

Nov. 3, 1964   J. K. MUREK   3,155,009
HIGH ENERGY ACTUATOR APPARATUS
Filed Aug. 3, 1961   2 Sheets-Sheet 2

INVENTOR.
JOSEF K. MUREK
BY
ATTORNEY

AGENT

United States Patent Office 3,155,009
Patented Nov. 3, 1964

3,155,009
HIGH ENERGY ACTUATOR APPARATUS
Josef K. Murek, San Diego, Calif., assignor to General Dynamics Corporation, San Diego, Calif., a corporation of Delaware
Filed Aug. 3, 1961, Ser. No. 129,120
2 Claims. (Cl. 91—25)

The present invention is related to the invention described and claimed in the copending application of Boniard I. Brown, Serial No. 91,436, filed February 24, 1961, for "High Rate Actuators," now U.S. Patent No. 3,093,118, which represents improvements upon the inventions of certain earlier applications identified in the above copending application.

The actuator of the above identified application comprises a thrust member having a head portion which is rendered cooperable with a wall by an external force applied thereto to provide a pressure seal therebetween about an enclosed portion of the wall. An actuating pressure is established which exerts a set force on an effective transverse area of the thrust member to urge the head portion toward the wall. A triggering force is applied to the thrust member to overbalance the set force, thereby disengaging the pressure seal and releasing the actuating pressure upon an area of the head portion. The thrust member is thus impelled from the wall to produce useful output thrust. Preferably, the head portion has a surface confronting the wall, and the thrust column has an effective transverse area spaced axially from the head surface and facing substantially oppositely from the head portion surface. The pressure seal is preferably effected by a resilient sealing element positioned between the wall and the head portion. A triggering pressure, which may be the same as the actuating pressure, may be applied to an area of the head portion to exert the triggering force.

The above described actuator of the copending application has certain disadvantages. These disadvantages relate to the provision of a pressure seal between the head portion surface of the thrust member and the wall. In order to provide a positive pressure seal in the actuator of the above copending application it is necessary that the head portion surface of the thrust member confront, and be very accurately parallel to the surface of the wall, otherwise an annular resilient seal positioned between these two surfaces would be ineffective to produce the desired positive sealing between the surfaces. Failure to provide positive sealing could result in premature firing of the actuator due to leakage of actuating fluid past the seal, and a reduction of output thrust and efficiency. To establish very accurate parallelism of the surfaces requires precision machining and positioning of the parts of the actuator. This is expensive and time consuming. Another disadvantage of the actuator of the above copending application is that in order to replace a worn seal, the entire actuator must be dismantled, which materially reduces the work time of the actuator.

The improved actuator of the present invention incorporates a novel sealing arrangement which is adapted to be removably mounted on a wall of the actuator to position a resiliently supported seal base member carrying a sealing element within the actuator housing. A thrust member is provided having a head portion with a surface within the housing which is urged by an external force to cooperate with the resiliently supported seal base member to effect positive pressure sealing by means of the sealing element about enclosed portions of the base member and head portion surfaces. An actuating pressure exerts a set force on an effective transverse area of the thrust member to urge the head portion toward the base member to maintain the pressure seal when the external force is removed. A triggering force is applied to the thrust member to overbalance the set force, thereby disengaging the pressure seal and releasing the actuating pressure upon an area of the head portion surface of the thrust member. The thrust member is impelled from the base member to produce useful output thrust. Preferably, the head portion has a surface substantially confronting the base member surface but need not be necessarily in precise parallelism therewith, and the thrust column has an effective transverse area spaced axially from the head portion surface and facing substantially oppositely from the head portion surface. A triggering pressure, which may be the same as the actuating pressure, may be applied to an area of the head portion surface to exert the triggering force.

The present invention provides distinct advantages over the invention in the above copending application and over the inventions disclosed in the earlier applications identified in the copending application. Positive pressure sealing can be achieved between the head portion surface of a thrust member and the resiliently supported seal base member surface of the sealing arrangement even though the head portion surface and the base member surface are somewhat out of parallel alignment due to inaccurate machining of parts, for example, as hereinbefore mentioned. The sealing arrangement is readily removable from the actuator for easy replacement of a seal between the two surfaces without complete dismantling of the actuator. A simplified and more economical actuator construction may therefore be utilized. Efficiency and output thrust are improved since leakage of actuating fluid is prevented by the improved sealing arrangement. Furthermore, premature actuation of the actuator is prevented which could occur due to poor sealing.

It is therefore an object of the present invention to provide a new and improved high rate actuator.

An object of the present invention is to provide an improved high rate actuator of simplified and economical construction.

Another object of the invention is the provision of an improved actuator which generally achieves the objects of the previous inventions herein mentioned.

A further object of the invention is the provision of an improved actuator having higher efficiency and output thrust.

Still a further object is the provision of a novel sealing assembly for an actuator which can be easily removed for replacement of a worn part without requiring dismantling of the actuator.

Another object of the invention is the provision of a novel removable sealing arrangement in an actuator which cooperates with the thrust member of the actuator to prevent premature actuation thereof by actuating pressure.

An object of the invention is the provision of a novel sealing arrangement in an actuator which is capable of accommodating itself to a thrust member surface of the actuator to provide positive pressure sealing therebetween to prevent premature actuation of the thrust member by actuating pressure.

Another object of the present invention is the provision of a novel sealing assembly which is capable of accommodating the surface of one member to the surface of another member to provide positive pressure sealing therebetween about portions of the surfaces to fluid pressure.

Other objects, features and advantages of the present invention will become apparent to those versed in the art from a consideration of the following description, the appended claims and the accompanying drawings, wherein:

Figure 1:
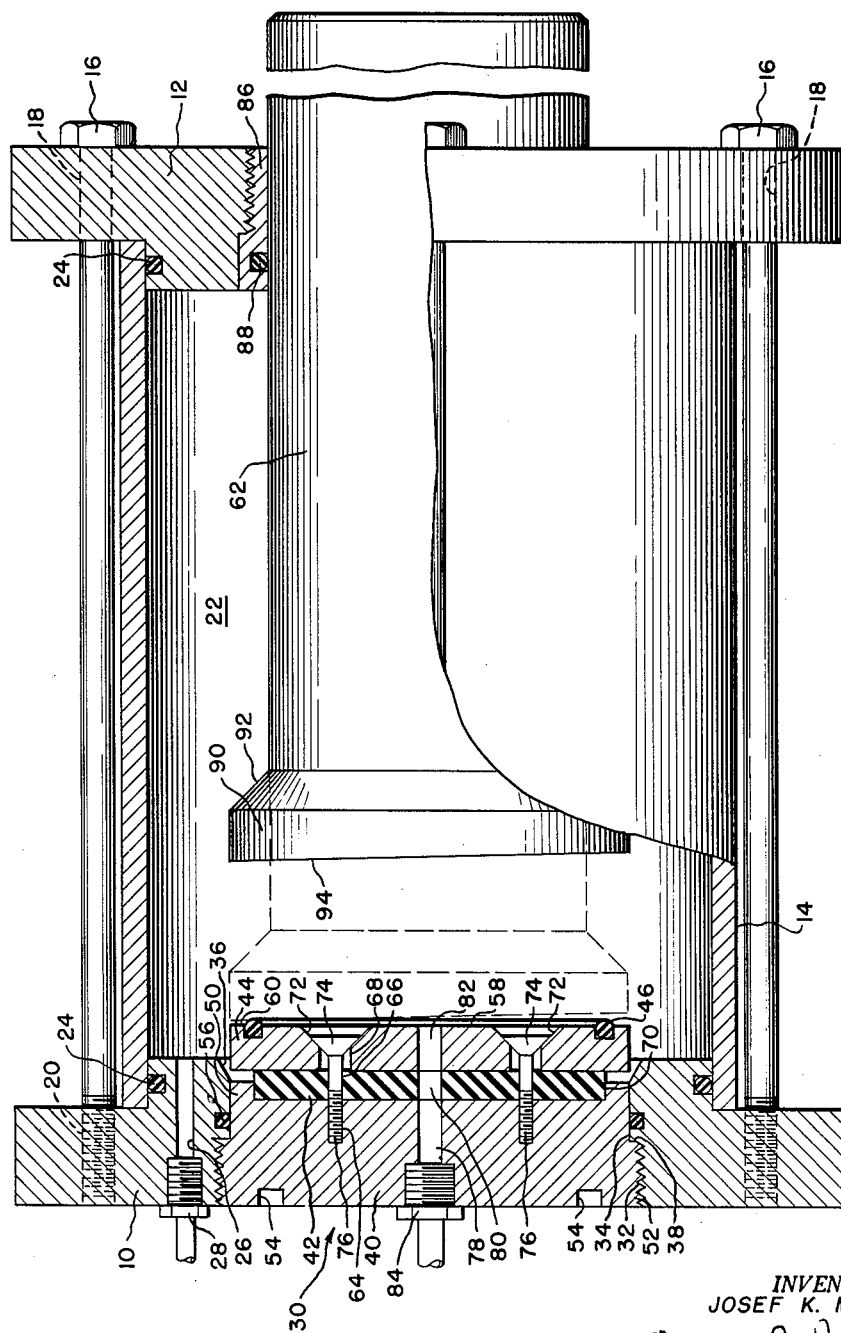
FIGURE 1 is an elevational view, partially in section, showing the details of the actuator of the present invention.

Referring to the drawings, and particularly to FIGURE 1, there is shown the actuator of the present invention. The actuator has a housing assembly formed by a wall member 10, an end member 12 and a cylinder 14, which are secured in clamped relation by tie-bolts 16. Each tie-bolt extends through an appropriate opening 18 in a flange portion of the end member 12 and is secured in a threaded opening 20 in a flange portion of wall member 10. A generally cylindrical actuating pressure chamber 22 is defined by the housing, and pressure sealing for the chamber is provided by resilient seal rings 24 adjacent to respective end portions of cylinder 14 in appropriate annular grooves in the wall member and end member. A passage 26 in the wall member and a fluid coupling 28 interconnect actuating pressure chamber 22 with a source of pressure (not shown).

An axial opening in the wall member accommodates a sealing arrangement generally indicated by the numeral 30. The axial opening consists of a threaded portion 32, a reduced diameter portion 34, and a countersunk portion 36. A shoulder 38 is provided for seating the sealing arrangement.

Figure 2:
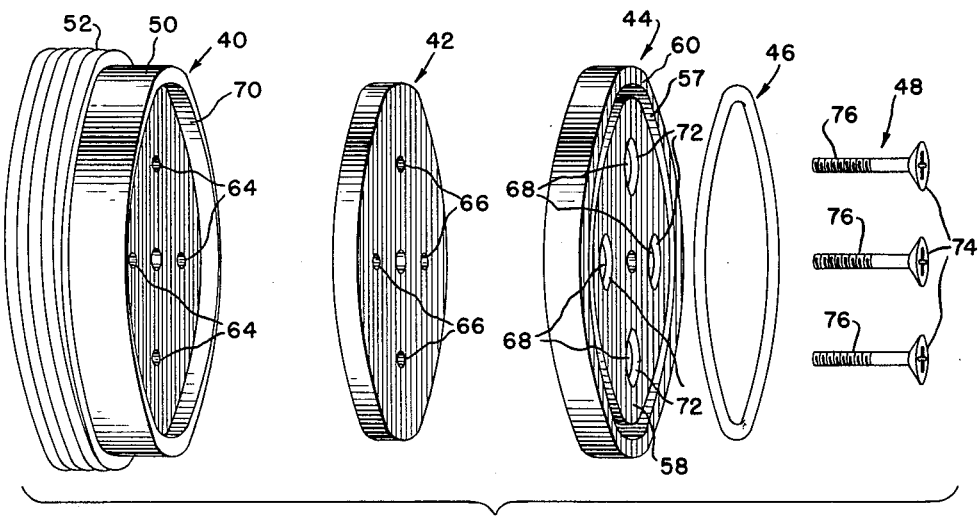
FIGURE 2 is an exploded view of the novel seal plate assembly of the actuator of FIGURE 1.

The sealing arrangement 30, as illustrated in FIGURES 1 and 2, consists generally of an insert member 40, a deformable member 42, a seal base member 44, a resilient sealing element 46, and screw fasteners 48.

The insert member 40 has a reduced portion 50 adapted to fit into the reduced diameter portion 34 of the opening in the wall member, and an enlarged threaded portion 52 adapted to engage the threaded portion 32 of the wall member opening. Apertures 54 in the insert member are provided for the reception of an appropriate tool (not shown) to rotate the insert member.

Pressure sealing is provided between the wall member 10 and the reduced portion 50 of the insert member by a resilient seal 56 which is disposed in an annular groove in the reduced portion 34 of the opening in the wall member.

The base member 44 is a circularly shaped metallic plate and conforms in diameter to the diameter of the reduced portion 34 of the opening in the wall member. The resilient annular sealing element 46 is secured as by bonding in an annular groove 57 in the base member to extend therefrom and divides one surface of the base member into an enclosed surface portion 58 and an outer surface portion 60.

Resilient coupling of the base member 44 to the insert member 40, and positioning of the base member within the actuator housing in substantial confrontation with a thrust member 62, is achieved by provision of the deformable member 42, aligned bores 64, 66, 68, and the screw fasteners 48. The deformable member 42 is a circular, plate-like body fashioned from a material such as rubber, preferably, or the like, and has a diameter so as to be readily accommodated within a circular aperture 70 in the insert member and to extend therefrom.

Aligned bores 64, 66, and 68, are circularly arranged in the insert member 40, the deformable member 42, and base member 44, respectively. The bores 64 are threaded and of substantially the same diameter as the bores 66. The bores 68 in the base member are of larger diameter than the bores 64, and 66, and have countersunk portions 72 adjacent the surface portion 58 of the base member.

Deformable member 42 is secured to the insert member and base member by the fasteners 48 having countersunk heads 74 and threaded shanks 76 positioned through the bores 68, and 66 to engage with the threaded bores 64 of the insert member. Shanks 76 are of substantially the same diameter as the bores 66 but of lesser diameter than the bores 68 of the base member. The heads 74 of the fasteners are adapted to seat in the countersunk portions of the bores 68 such that they lie below the surface portion 58 of the base member.

A plurality of aligned bores 78, 80, and 82 and coupling 84 provide a fluid passage connecting the surface portion 58 within the sealing element 46 to a source of triggering pressure (not shown), which may be the same as the source of actuating pressure.

The output thrust member 62 is axially disposed in the housing and is slidably mounted in an annular bearing 86 which is threadedly secured in an opening in the end member 12. A sealing ring 88 in a bearing groove provides pressure sealing about the thrust member.

An enlarged head portion 90 is provided at the inner end of the thrust member. The head portion has back surface 92 and a front surface 94. The surface 94 is illustrated as being substantially out of parallelism with the surface of the base member as would be the case if the head portion surface were inaccurately formed, as for example by improper machining. The inaccuracy is greatly exaggerated for the purposes of illustrating the present invention, it being readily apparent that more accurate parallelism between the surfaces could be established and still practice the present invention.

Figure 3:
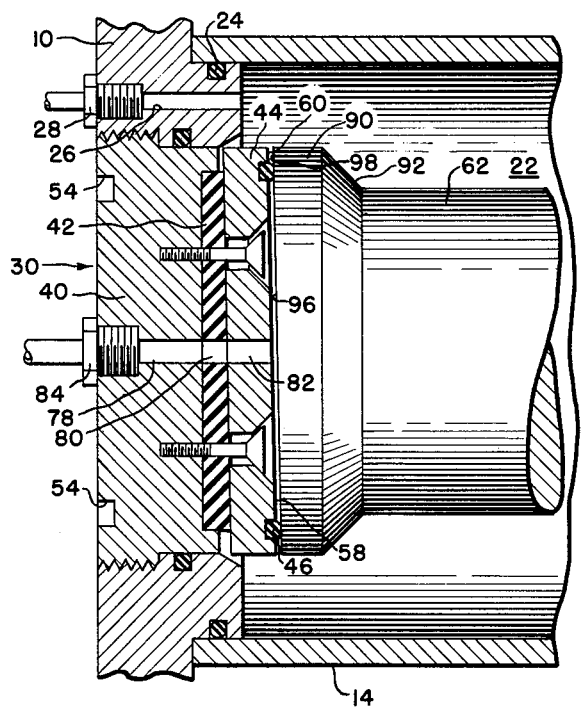
FIGURE 3 is a fragmentary view of the actuator of FIGURE 1 showing the thrust member and the seal plate assembly in engagement to form sealing therebetween.

To prepare the actuator of FIGURE 1 for operation, the thrust member 62 is moved by external force whereby initially the head portion surface 94 partially engages the annular resilient sealing element 46, as shown by the dash line position of the head portion in FIGURE 1. Continued application of external force on the thrust member moves the base member to deform the deformable member 42 until the base member surface is in substantially parallel alignment with the surface 94 of the head portion, as shown in FIGURE 3. The resilient sealing element 46 is compressed against the surface 94 of the head portion to thereby effect a pressure seal about a surface portion 96 of the head portion surface and about the surface portion 58 of the base member 44. The sealing element 46 and the pressure seal it provides also define an annular surface area 98 of the head portion surface radially outside the pressure seal and the annular surface portion 60 of the base member.

Next a relatively high actuating pressure is introduced into the actuating pressure chamber 22 through the coupling 28 and the passage 26. The actuating pressure acts upon the effective transverse area of back surface 92 of the head portion 90, and thereby exerts a set force which serves to urge the head portion 90 toward the base member 44 to maintain the pressure seal when the external force is removed. The actuating pressure also exerts force on the annular area 98 of the head portion surface radially outside the pressure seal. This force opposes the set force.

From the foregoing, it will be understood that the actuator of the present invention is provided with a removable sealing arrangement having a resiliently supported base member which is capable of cooperating with the head portion of a thrust member of an actuator to accommodate itself thereto to provide confronting and substantially parallelly aligned surfaces such that a positive pressure seal is effected by a sealing element positioned between the surfaces even if they are initially lacking in parallelism.

To operate the actuator, the set force is overbalanced by a triggering force to release the actuating pressure over the entire surface 94 of the head portion 90. The triggering force may be applied to the thrust member in various ways, such as the application of external mechanical force. It may be preferably applied by applying a triggering pressure to an area of the head portion. A triggering pressure may be introduced through the coupling 84 and the aligned bores 78, 80, and 82 to the area 96 of the head portion 90 surface within the pressure seal formed by the resilient sealing element 46. The triggering pressure must be sufficient to overbalance the set force by cooperating with the force on the area 98 outside the pressure seal.

The overbalancing action of the triggering pressure unseats the thrust member head portion and suddenly disengages the resilient sealing element 46 from the head portion. The resilient sealing element maintains a positive pressure seal up to the instant of its disengagement, whereupon the actuating pressure is released substantially instantaneously upon the area 96 of the head portion surface. The thrust member 62 is suddenly impelled with great force from the base member 44 to produce high rate output thrust.

From the foregoing description, it will be appreciated that the actuating pressure has free access to the head portion surface 96 of the thrust member after the unseating of the head portion from the base member. Actuating pressure is thus effectively maintained against the rapidly moving thrust member without substantial restriction. High output thrust and efficiency are therefore achieved.

The thrust member 62 is adapted to impact a workpiece (not shown). Thrust member movement is thereby stopped, and special structure is not required to effect deceleration of the thrust member.

To prepare the actuator for repeat operation, the thrust member head portion 90 is reseated against the base member 44 by the application of external force to the thrust member.

Upon the reseating of the thrust member head portion 90, the trapping of pressure in the space defined by base member surface portion 58, the annular sealing element 46 and the head portion surface area 96 within the pressure seal, is prevented by relieving pressure through the aligned bores 78, 80, and 82, and the coupling 84. Pressure such as the actuating pressure trapped in this space would act on the head portion area 96 to oppose the set force exerted on the effective transverse area of head portion back surface 92 by the actuating pressure. A small triggering force of low triggering pressure would then effect movement of the thrust member from the base member. This would prevent effective triggering and cause premature slow movement of the thrust column, thereby preventing effective operation of the actuator.

Although a specific embodiment of the present invention has been illustrated and described herein, it will be understood that the same is merely exemplary of the presently preferred embodiment capable of attaining the objects and advantages hereinbefore mentioned, and that the invention is not limited thereto; numerous variations will be readily apparent to those versed in the art, and the invention is entitled to the broadest interpretation within the terms of the appended claims.

What I claim is:

1. An actuator comprising means defining a wall, a thrust member having a head portion with a surface, a base member having a surface, seal means positioned between said surfaces to provide a pressure seal therebetween about a portion of said head portion surface, a plurality of bores through said base member and having countersunk portions adjacent said base member surface, a member removably positioned on said wall, a body of elastic material positioned intermediate said removable member and base member, screw fasteners having shanks of lesser diameters than the diameters of said bores and countersunk heads, said shanks being positioned through said bores and said body in threaded engagement with said removable member to secure together said removable member, said body, and said base member and position said countersunk heads below said base member surface in engagement with said countersunk portions, said thrust member and said base member being cooperable to effect said pressure seal, means establishing an actuating pressure, means for applying said actuating pressure to said thrust member to exert a set force urging said thrust member toward said base member to maintain said pressure seal, and means for applying a triggering force to said thrust member to overbalance said set force to eliminate said pressure seal and release said actuating pressure upon said portion of said head portion surface, whereby said thrust member is impelled from said base member to produce output thrust.

2. An actuator comprising means defining a wall, a thrust member having a head portion with a surface, a base member having a surface, seal means positioned between said surfaces to provide a pressure seal therebetween about a portion of said base member surface, a plurality of bores through said base member and having countersunk portions adjacent said base member surface, a member threadedly engaging said wall, tool receiving means on said threaded member for rotating said threaded member, a body of elastic material positioned intermediate said threaded member and base member, screw fasteners having shanks of lesser diameters than the diameters of said bores and countersunk heads, said shanks being positioned through said bores and said body in threaded engagement with said threaded member to secure together said threaded member, said body, and said base member and position said countersunk heads below said base member surface in engagement with said countersunk portions, said thrust member and said base member being cooperable to effect said pressure seal, aligned bores through said threaded member, said body, and said base member for providing a fluid passage to said portion of said base member surface, means establishing an actuating fluid pressure, means for applying said actuating fluid pressure to said thrust member to exert a set force urging said thrust member toward said base member to maintain said pressure seal, and means for applying a triggering fluid pressure through said fluid passage to said thrust member to overbalance said set force to eliminate said pressure seal and expose an area of said head portion surface to said actuating fluid pressure, whereby said thrust member is impelled from said base member to produce output thrust.

References Cited in the file of this patent

UNITED STATES PATENTS

| | | |
|---|---|---|
| 2,343,316 | Newkirk | Mar. 7, 1944 |
| 2,662,348 | Jacobsson | Dec. 15, 1953 |
| 2,731,036 | Hughes | Jan. 17, 1956 |
| 2,740,859 | Beatty et al. | Apr. 3, 1956 |
| 2,840,337 | Sasserson | June 24, 1958 |

FOREIGN PATENTS

| | | |
|---|---|---|
| 1,098,311 | Germany | Jan. 26, 1961 |